Nov. 13, 1923.
J. W. BROWN
1,474,231
COMBINED COLLAR AND MUZZLE
Filed Feb. 28, 1923
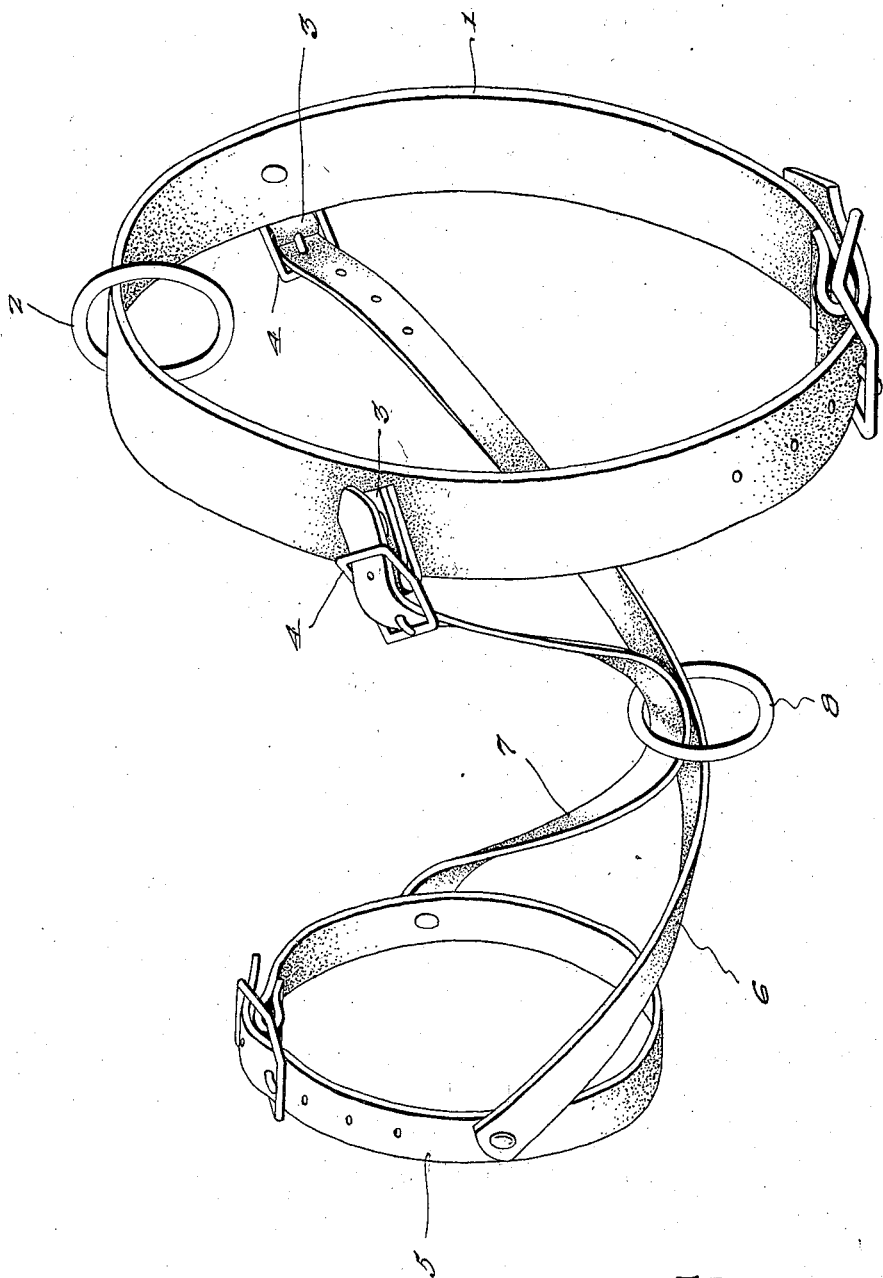
J. W. Brown
INVENTOR
BY Victor J. Evans
ATTORNEY Patented Nov. 13, 1923.

1,474,231

UNITED STATES PATENT OFFICE.

JOHN W. BROWN, OF FORT SCOTT, KANSAS.

COMBINED COLLAR AND MUZZLE.

Application filed February 28, 1923. Serial No. 621,853.

*To all whom it may concern:*

Be it known that I, JOHN W. BROWN, a citizen of the United States, residing at Fort Scott, in the county of Bourbon and State of Kansas, have invented new and useful Improvements in Combined Collars and Muzzles, of which the following is a specification.

The object of this invention is to produce a combined collar and muzzle for horses, cows, dogs or any other long nosed animal.

A further object is to produce an article of this class that shall be characteristic of simplicity in construction, cheapness in manufacture and strength and reliability when arranged on an animal.

The drawing, which accompanies and which forms part of this application illustrates a satisfactory embodiment of the invention, and in which:

The figure illustrates a perspective view of the improvement.

The improvement includes a strap having a buckle at one end and its other end provided with apertures to receive the tongue of the buckle therethrough. This strap comprises the collar 1 of the improvement. On the collar there may be arranged a lead ring 2. The collar has its outer face at diametrically opposed points provided with short straps 3 that carry buckles 4.

The muzzle strap is indicated by the numeral 5, the same having at one end a buckle whose tongue passes through one of a plurality of spaced apertures in the second end of the strap. The muzzle strap 5, at diametrically opposite points has secured thereon straps 6 and 7 respectively, which pass through a lead ring 8 and which have spaced apertures adjacent their ends to be engaged by the tongue of the buckles 4 on the straps 3. The straps 6 and 7 cross each other so that the same are conveniently positioned below the lower jaw of the animal and against the sides of the animal's face.

When the animal is not to be muzzled, the straps 6 and 7 are detached from the buckles 4, leaving the collar strap 1 on the animal, and it is thought that the above description. when taken in connection with the drawings will fully set forth the construction and advantages of the improvement to those skilled in the art to which such inventions appertain.

Having thus described my invention what I desire to claim as new is:—

Two straps, one of a greater length than the other and both rounded upon themselves to provide respectively a collar and a muzzle, means adjustably connecting the ends of the said collar and said muzzle, a ring on the collar for a lead strap, crossed straps fixedly secured to the sides of the muzzle and adjustably connected with the sides of the collar and a ring for a lead strap, slidably arranged on the crossed straps.

In testimony whereof I affix my signature.

JOHN W. BROWN.